H. B. & L. A. SHULTZ.
MOLD FOR CONCRETE POSTS.
APPLICATION FILED JAN. 22, 1910.
987,499.
Patented Mar. 21, 1911.
5 SHEETS—SHEET 1.
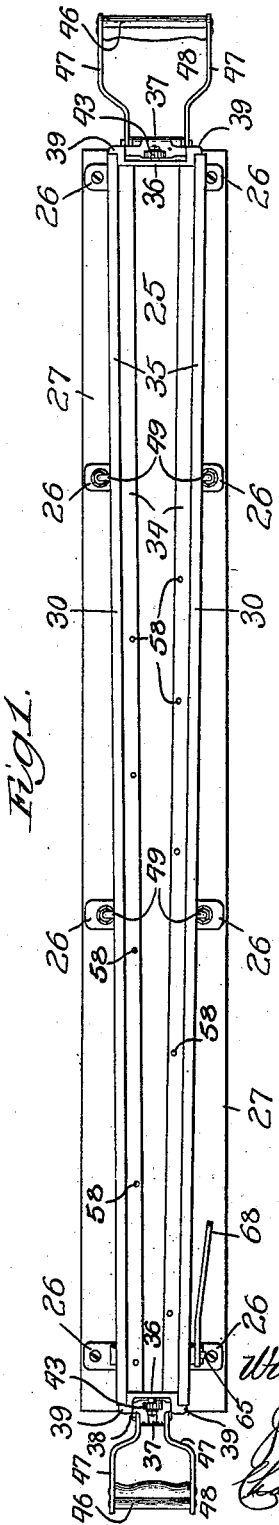
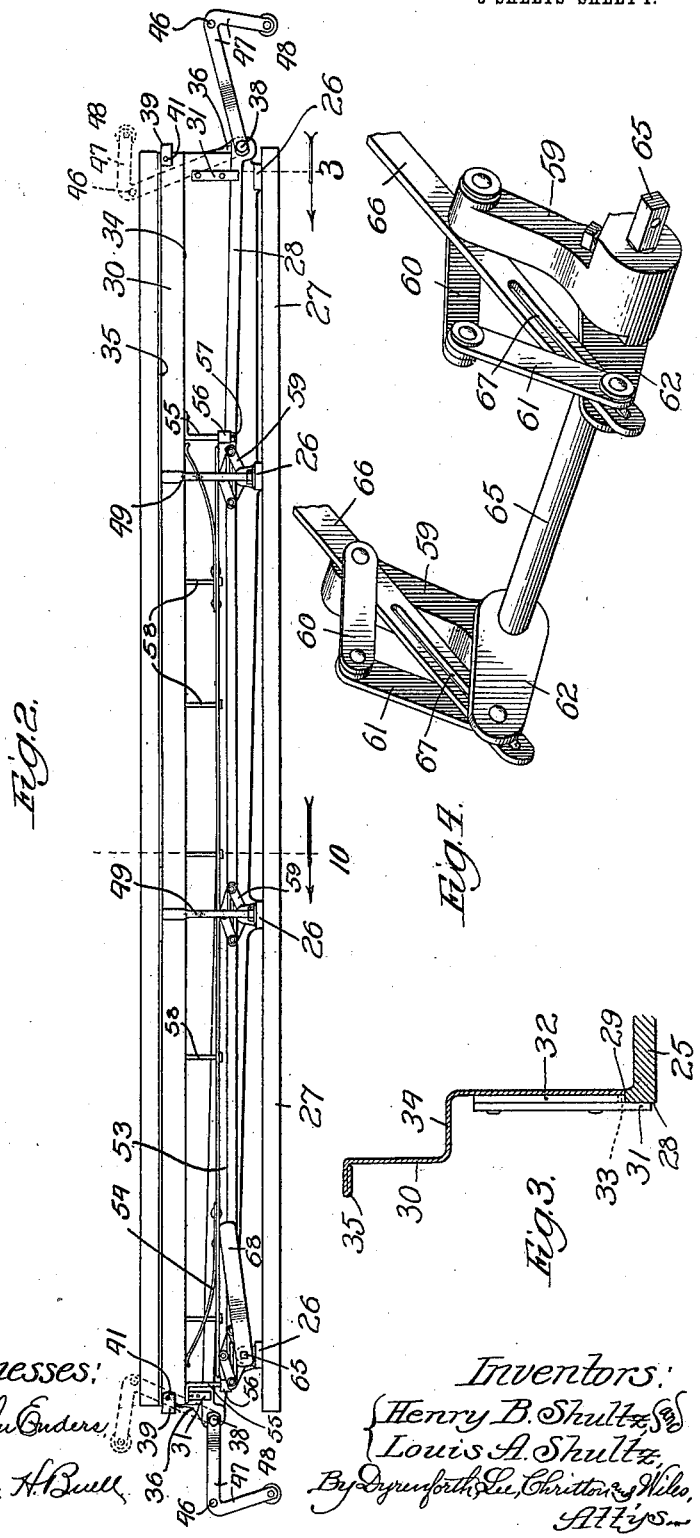

H. B. & L. A. SHULTZ.
MOLD FOR CONCRETE POSTS.
APPLICATION FILED JAN. 22, 1910.
987,499.
Patented Mar. 21, 1911.
5 SHEETS—SHEET 2.
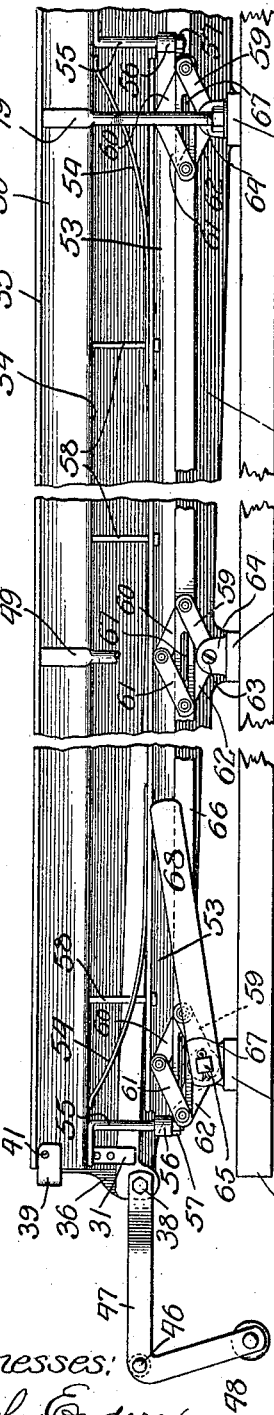
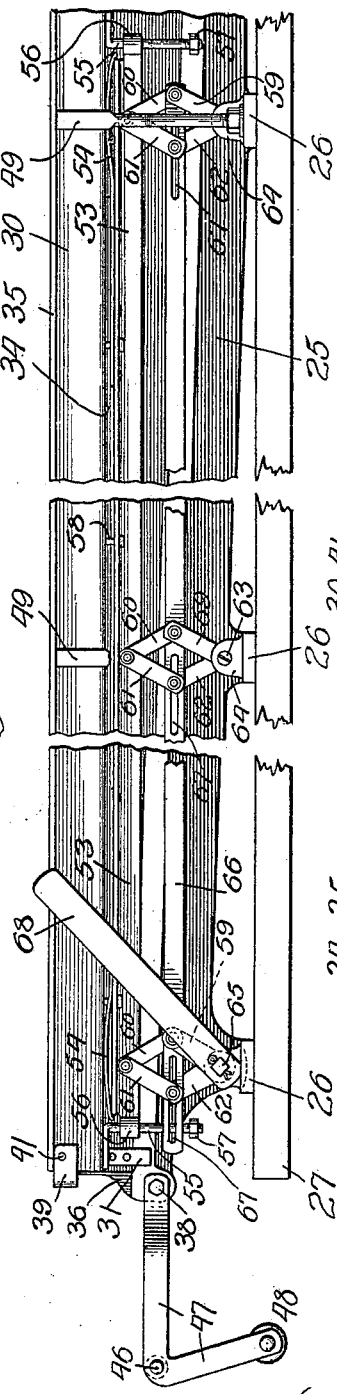
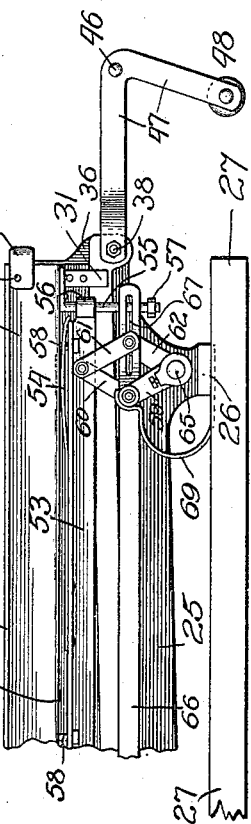
Witnesses:
John Endere
Chas. H. Buell.
Inventors:
Henry B. Shultz,
Louis A. Shultz,
By Dyrenforth, Lee, Chritton & Wiles,
Att'ys H. B. & L. A. SHULTZ.
MOLD FOR CONCRETE POSTS.
APPLICATION FILED JAN. 22, 1910.
987,499.
Patented Mar. 21, 1911.
5 SHEETS—SHEET 3.
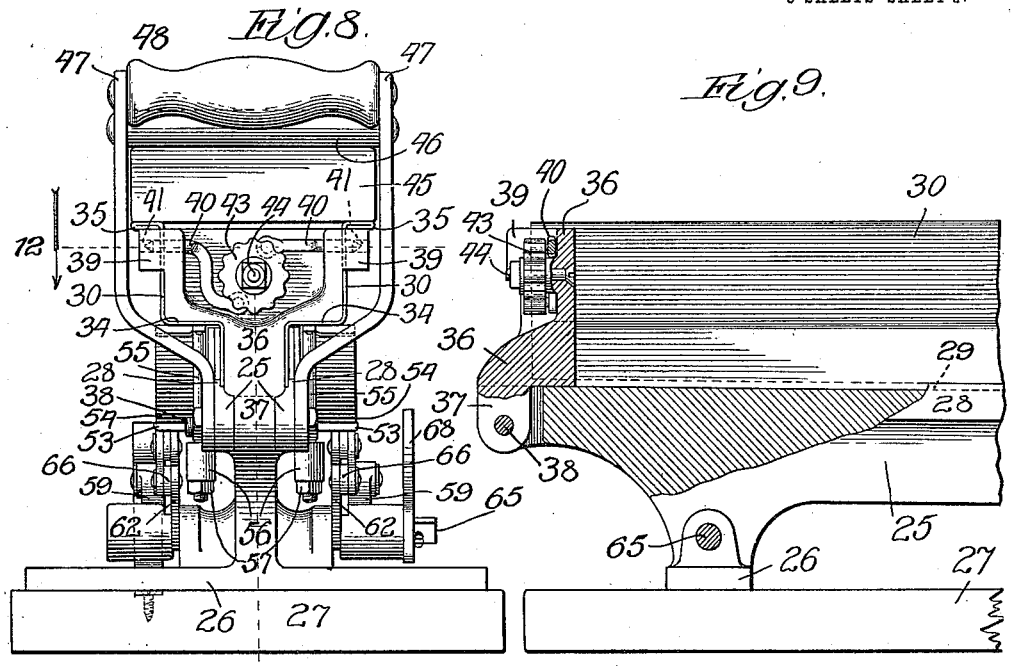
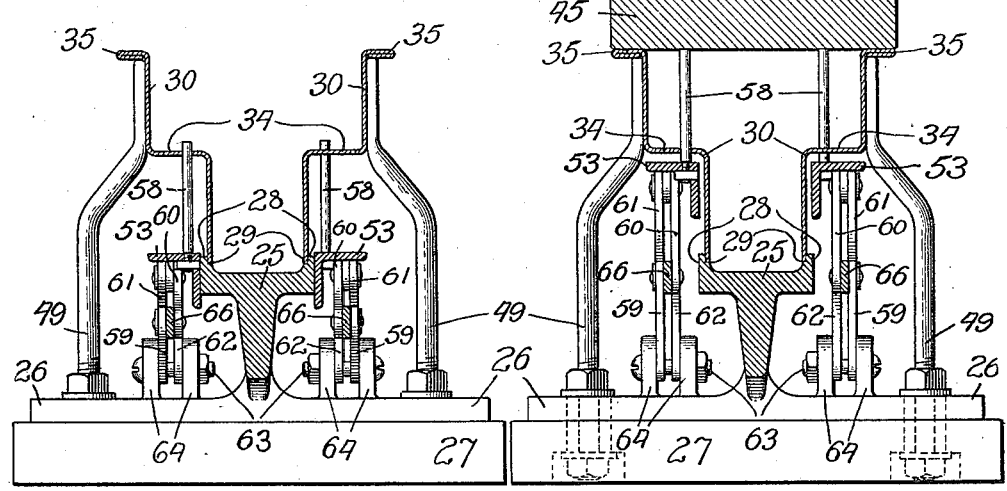
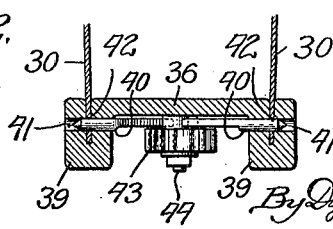
Witnesses:
John Enders
Chas. H. Buell
Inventors:
Henry B. Shultz
Louis A. Shultz,
By Dyrenforth, Lee, Chritton & Wiles,
Attys

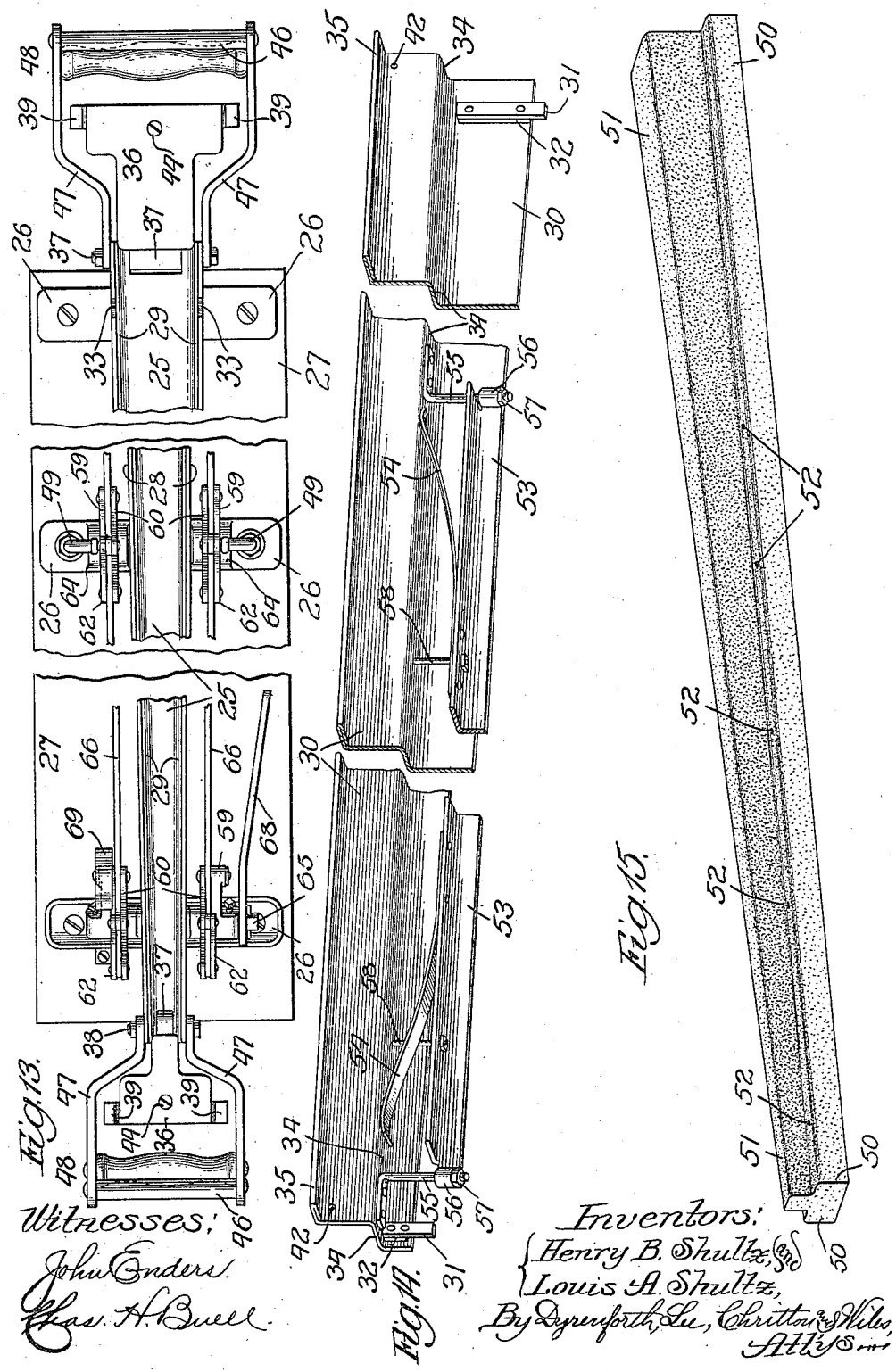

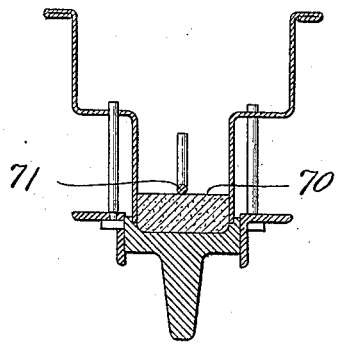
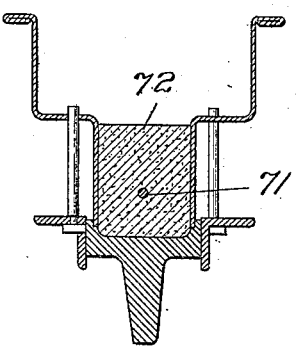
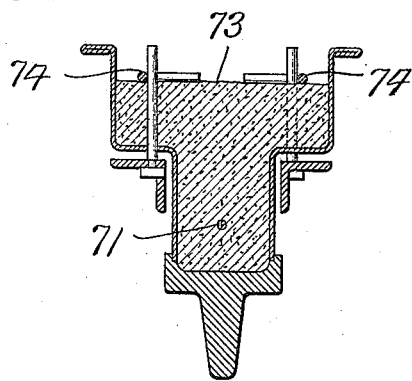
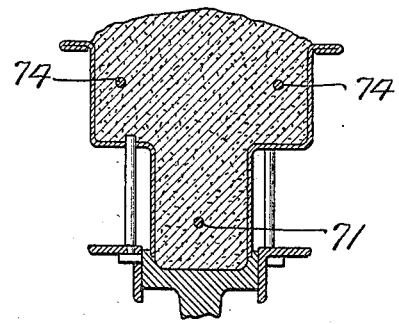
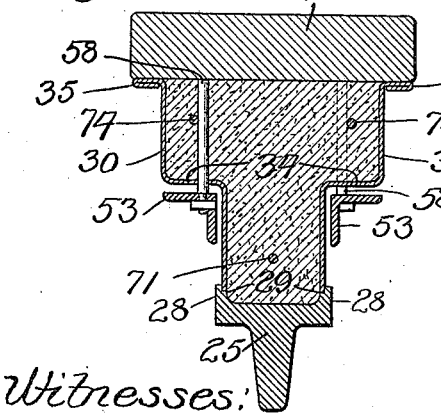
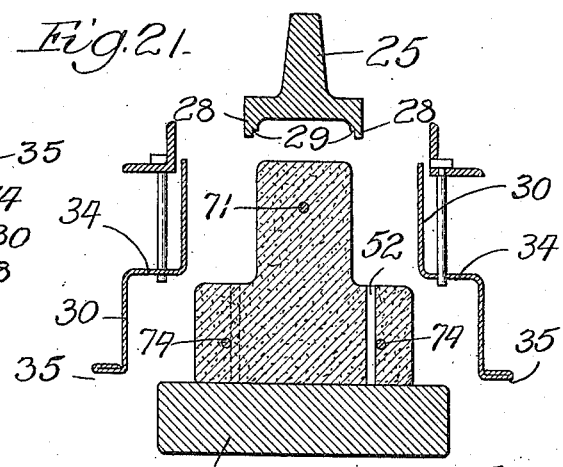

UNITED STATES PATENT OFFICE.

HENRY B. SHULTZ AND LOUIS A. SHULTZ, OF MINNEAPOLIS, MINNESOTA.

MOLD FOR CONCRETE POSTS.

987,499.  Specification of Letters Patent.  Patented Mar. 21, 1911.

Application filed January 22, 1910. Serial No. 539,504.

*To all whom it may concern:*

Be it known that we, HENRY B. SHULTZ and LOUIS A. SHULTZ, citizens of the United States, residing at Minneapolis, in the county of Hennepin and State of Minnesota, have invented a new and useful Improvement in Molds for Concrete Posts, of which the following is a specification.

Our invention relates to improvements in molds for making reinforced concrete fence-posts and our object is to provide a mold for the purpose, of improved construction which shall be durable and effectual in use.

In the accompanying drawings which show our invention in its preferred embodiment—Figure 1 is a plan view of the mold; Fig. 2 is a view in side elevation of the same, showing the handles in full lines, in their normal position and representing them by dotted lines in their position for clamping a pallet on the mold; Fig. 3 is an enlarged broken sectional view of a detail, on line 3, Fig. 2; Fig. 4 is an enlarged broken perspective view of pin-raising mechanism; Figs. 5 and 6 are enlarged broken views in side elevation of a portion of the mold showing respectively the pins in their lowered and raised positions; Fig. 7 is a broken view in side elevation at one end of the mold showing the opposite side to that presented in Fig. 2; Fig. 8 is a still further enlarged view in end elevation showing the left-hand end of the mold with a pallet thereon and with the handle raised to clamp the same; Fig. 9 is a broken view in vertical section on line 9, Fig. 8 but omitting the pallet and handle; Fig. 10 is a view in cross-section on line 10, Fig. 2, showing the hole-forming pins in their lowered position; Fig. 11 is a similar view showing the pins in their raised position; Fig. 12 is a broken plan sectional view on line 12, Fig. 8; Fig. 13 is a broken plan view of the mold with the sides removed; Fig. 14 is a broken perspective view of a mold-side; Fig. 15 is a perspective view of a molded concrete fence-post, and Figs. 16 to 21 inclusive, are views in transverse section through the mold illustrating different steps in the process of forming a post.

A bottom mold-member 25, preferably of cast-iron, provided with a number of brackets or feet 26 suitably spaced apart, is secured to a base 27 which supports the mold. As shown in Fig. 10, the bottom-member 25 is formed with a central depression which extends from end to end along its upper face between lateral flanges 28. The sides of these flanges as well as the upper face of the member are preferably surfaced or " tooled ", and recessed seats 29 are provided along the inner edges of the flanges. Two similar side-members 30, preferably of sheet-metal, are supported by the bottom-member with their lower edges resting on the seats, in which position they are held against displacement when the mold is assembled, by fingers 31 attached adjacent to their ends, see Figs. 3 and 14, which are caused to impinge against the flanges by spacing-strips 32 of proper thickness which are interposed between the fingers and side-members. Adjacent to the right-hand end of the bottom-member (Fig. 13), the flanges 28 are provided with notches 33 which receive the ends of the spacing-strips 32 and by their engagement therewith the side-members are prevented from slipping lengthwise along the bottom-member. Each side-member of the mold is offset longitudinally between its upper and lower edges to provide a horizontal section 34, and an outwardly extending flange 35 is formed along the upper edge of each of the side-members by doubling the metal on itself, as shown in Figs. 10, 11 and 14, for stiffening the same and to afford a smooth edge thereto. It will be noted that this shape of mold provides for the formation of a post T-shaped, in transverse section, and since it is desirable, for obvious reasons, that each post shall be of larger dimensions at one end than at its other, see Fig. 15, the bottom-member and side-members of the mold are tapered as shown. Each end of the bottom-member is bifurcated and mold-ends 36 provided with ears 37 extending between the furcations are pivoted thereto by pins or bolts 38. The ends are of a contour which permits them to rest at their base on the bottom-member (Fig. 9), and to enter between the side-members when they are swung about their pivots to their raised or closed position as illustrated. Each mold-end is equipped at its upper edge, or free end, with slotted flanges 39 (Fig. 12), which embrace the side-members when the ends are raised, and are adapted to be locked when in this position by bolts 40 which are shot through registering holes 41 of the flanges 39 and holes 42 adjacent to the ends of the side-members. The bolts 40 are pivotally secured at their inner ends to disks 43 on the mold-ends which are pivoted thereto by a bolt 44, so that by turning the disk the bolts may be shot or withdrawn to lock or unlock the mold-ends as desired.

After a post has been formed in the mold a pallet 45 (Figs. 2 and 8) is placed thereon to rest on the flanges 35 and is clamped to the mold by bars 46 extending between yokes 47 of handles 48. These yokes are pivoted upon the bolts 38 outside of the bottom-member, and the pallet is engaged and clamped by the bars 46 of the handles when they are swung to their raised position as represented by dotted lines in Fig. 2, and with the handles in this position they afford means for carrying the mold when it is desired to move the same.

To provide added rigidity to the side-members of the mold, the bolts 49, which secure the intermediate feet 26 to the base 27, are extended to form braces and offset so as to bear at their upper ends against these members with their ends supporting the flanges 35. Slots are provided as shown by dotted lines in Fig. 11 to permit of adjustment of the braces to and from the mold.

The post (Fig. 15), having lateral flanges 50 extending from opposite sides of its centrally disposed reinforcing-rib 51, is provided with holes 52 extending through the flanges for the purpose of attaching a fence thereto. These holes are formed by pins which are passed through the flanges before the post is removed from the mold and while it is in a plastic condition.

A pin-carrying frame comprising an angle-iron 53 with springs 54 at its ends is movably secured to each side-member by guides 55 in the form of bolts which are rigidly attached to the side-member and pass through eyes 56 on the ends of the angle-irons. The guides are provided with nuts 57 which form adjustable stops for the frame and prevent its withdrawal therefrom. Each frame is normally held in contact with the stops by the springs 54, which bear at their free ends against the offset portion 34 of the side-members 30. Each frame carries vertically-disposed pins 58 preferably rigid therewith, which pass through the offset portions of the side-members in which they have bearings, and are adapted to be raised to contact with the pallet, as shown in Fig. 11, for forming the holes through the lateral flanges of the post.

Beneath each angle-iron 53 are three "lazy-tongs", which have contact-bearings with the underside of its horizontal flange, for the purpose of raising the pins. Each lazy-tongs comprises links 59, 60, 61 and 62, the links 59 and 62 of two of the lazy-tongs being pivoted at 63 between ears 64 rising from the intermediate feet 26, while the corresponding links of the other section are mounted on a shaft 65 having a bearing in the end bracket or foot, Figs. 5, 6, 8 and 9.

The links 59 on this shaft are in the nature of crank-arms and are rigidly secured thereto while the links 62 on the shaft are loosely mounted thereon. The various links 59 and 60 are pivotally connected with a bar 66 and adjacent to their pivots the bar is provided with longitudinal slots 67 through which pass pins forming pivots for adjacent ends of the links 61 and 62. The shaft 65 carries at one end a hand-lever 68 for rocking it, and as the handle is turned from the position shown in Fig. 5 to that illustrated in Fig. 6 the link or crank-arm 59 on the shaft, in turning through an arc of a circle, raises and throws the bar 66 lengthwise, which has the effect of raising or lengthening the lazy-tongs simultaneously, and thus raises the pin-carrying frame to the position shown in Fig. 11. The pins are held in their raised position until the handle is turned in the reverse direction, by the engagement of the free end of a spring 69 (Fig. 7) with one of the adjacent lazy-tongs links 59. The pressure of the spring against the links is only sufficient to maintain the pins in raised condition until overcome by the turning of the handle, or by contact of the tamper with the pins, should the latter inadvertently be left in a raised position while the tamping of the concrete is being done. A peculiar advantage is afforded by the employment of the lazy-tongs, in that they exert a pressure against the angle-irons in a perpendicular direction at all times as they raise the frames to force the pins through the mold. This prevents binding and undue friction that would result if other mechanism were employed, which would exert a dragging effect upon the angle-irons in raising the frame, as for instance, in the use of cams, or directly-connected cranks.

The mold is employed in the following way: After the side-members have been positioned on the bottom-member and the mold-ends raised and locked in position, as described, the mold is in condition for receiving concrete which is filled in to the level represented at 70, Fig. 16, on which is placed a metal reinforcing-insert 71. The mold is then filled sufficiently and the concrete tamped to compact the material forming the rib of the mold with the concrete wrought to the level represented at 72, Fig. 17. In the next step the mold is filled to the level shown at 73, Fig. 18, the pins 58 raised and inserts 74 similar to the insert 71 are then placed thereon and in contact with the pins as shown. The mold is then filled with concrete and rounded up as shown in Fig. 19 after which the pins 58 are lowered and the material again tamped and leveled and smoothed off, whereupon a pallet is placed on the mold and locked in position thereon by swinging the handles to their raised positions, and the pins again raised to form the holes through the lateral flanges of the post. This completes the molding of the post, and the mold is then removed to the curing-frame, being carried by the handles, where it is inverted so as to rest upon the pallet. The mold-ends may then be unlocked and the handles swung to disengage the pallet after which the bottom-member is removed leaving the side-members on the post, which are thereafter removed, whereupon the mold-members may be immediately reassembled for molding another post.

Each post after it has been molded and placed upon the curing-frame, is allowed to remain on its pallet until the concrete has become sufficiently set or seasoned to permit of its removal. This obviously necessitates the employment of a large number of pallets in the continued operation of the mold.

What we claim as new, and desire to secure by Letters Patent, is—

1. In a concrete-post mold, the combination of a bottom-member, side-members removably supported on the bottom-member and provided with holes adjacent to their ends, mold-ends pivoted to the bottom-member to swing between the side-members and rest upon the bottom-member, flanges on the mold-ends adapted to embrace the ends of the side-members and provided with holes through them and adapted to register with said holes in the side-members, bolts on the mold-ends for engaging said registering holes in the side-members and flanges, and means on the mold-ends for actuating said bolts.

2. In a concrete-post mold, the combination of a bottom-member provided with lateral flanges, recessed seats along the flanges, side-members removably supported on the bottom-member in said seats, means for releasably holding the side-members in said recessed seats, mold-ends pivoted to swing into engagement with the side-members, and means for locking the mold-ends and side-members together.

3. In a concrete-post mold, the combination of a bottom-member provided with lateral flanges, recessed seats along the flanges, side-members removably supported on the bottom-member in said seats, fingers on the side-members adapted to impinge against said lateral flanges, mold-ends pivoted to swing into engagement with the side-members, and means for locking the mold-ends and side-members together.

4. In a concrete-post mold, the combination of a bottom-member provided with lateral flanges, recessed seats along said flanges, notches in the flanges, side-members removably supported on the bottom-member in said seats, fingers on the side-members adapted to impinge against said flanges and means on the side-members for engaging said notches, mold-ends pivoted to swing into engagement with the side-members, and means for locking the mold-ends and side-members together.

5. In a concrete-post mold, the combination of a bottom-member provided with lateral flanges, recessed seats along the flanges, side-members removably supported on said bottom-member in said seats, fingers on the side-members adapted to impinge against said flanges, mold-ends pivoted to swing into engagement with the side-members, means for locking the mold-ends and side-members together, and braces on said bottom-member engaging the side-members.

6. In a concrete-post mold, the combination of a bottom-member provided with lateral flanges, recessed seats along the flanges, side-members removably supported on said bottom-member in said seats, fingers on the side-members adapted to impinge against said flanges, mold-ends pivoted to swing into engagement with the side-members, means for locking the mold-ends and side-members together, and braces adjustable on said bottom-member engaging the side-members.

7. In a concrete-post mold, the combination of a bottom-member, perforated and offset side-members removably supported on the bottom-member, frames movable on the side-members, pins on the frames extending through said perforations, and means for moving the frames to force the pins through the mold.

8. In a concrete-post mold, the combination of a bottom-member, perforated and offset side-members removably supported on the bottom-member and provided with lateral flanges along their upper edges, frames movable on the side-members, pins on the frames extending through said perforations, and means for moving the frames to force the pins through the mold.

9. In a concrete-post mold, the combination of a bottom-member, perforated and offset-side-members removably supported on the bottom-member, frames movable on said side-members, guides for said frames, pins on the frames extending through said perforations, and means for moving the frames to force the pins through the mold.

10. In a concrete-post mold, the combination of a bottom-member, perforated and offset side-members removably supported on the bottom-member, frames movable on said side-members provided with eyes, guides for the frames passing through said eyes and provided with stops for limiting the downward movement of the frames, pins on the frames extending through said perforations, and means for moving said frames to force the pins through the mold.

11. In a concrete-post mold, the combination of a bottom-member, perforated and offset side-members removably supported on the bottom-member, frames movable on said side-members, guides for the frames, pins on the frames extending through said perforations, means for moving said frames in one direction to force the pins through the mold, and means for moving the frames in the opposite direction.

12. In a concrete-post mold, the combination of a bottom-member, perforated and offset side-members removably supported on the bottom-member, frames movable on the side-members, guides for the frames, pins on the frames extending through said perforations, and lever-actuated lazy-tongs for moving the frames to force the pins through the mold.

13. In a concrete-post mold, the combination of a bottom-member, perforated and offset side-members removably supported on the bottom-member, frames movable on said side-members, guides for the frames, pins on the frames extending through said perforations, lazy-tongs for moving the frames to force said pins through the mold, a shaft connected with the lazy-tongs, and means for rocking the shaft to actuate said lazy-tongs.

14. In a concrete-post mold, the combination of a bottom-member, perforated and offset side-members removably supported on the bottom-member, frames movable on said side-members, guides for the frames, pins on the frames extending through said perforations, lazy-tongs for moving the frames to force said pins through the mold, means for actuating the lazy-tongs, and means for releasably holding the pins against withdrawal when forced through the mold.

15. In a concrete-post mold, the combination of a bottom-member, perforated and offset side-members removably supported on the bottom-member, frames movable on the side-members, guides for the frames, pins on the frames extending through said perforations, lever-actuated lazy-tongs for moving the frames in one direction to force the pins through the mold, springs for retracting the pins, and means for releasably holding the pins against withdrawal when forced through the mold.

HENRY B. SHULTZ.
LOUIS A. SHULTZ.

In presence of—
CHAS. E. GAYLORD,
RALPH SCHAEFER.

---

Copies of this patent may be obtained for five cents each, by addressing the "Commissioner of Patents, Washington, D. C."